US010601191B2

(12) United States Patent
Yamazaki

(10) Patent No.: US 10,601,191 B2
(45) Date of Patent: Mar. 24, 2020

(54) CONNECTOR MODULE AND ONBOARD CAMERA USING THE SAME

(71) Applicant: HOSIDEN CORPORATION, Osaka (JP)

(72) Inventor: Masakazu Yamazaki, Osaka (JP)

(73) Assignee: Hosiden Corporation, Osaka (JP)

( * ) Notice: Subject to any disclaimer, the term of this patent is extended or adjusted under 35 U.S.C. 154(b) by 0 days.

(21) Appl. No.: 16/145,453

(22) Filed: Sep. 28, 2018

(65) Prior Publication Data

US 2019/0103716 A1  Apr. 4, 2019

(30) Foreign Application Priority Data

Oct. 2, 2017   (JP) ................. 2017-192413
Nov. 17, 2017  (JP) ................. 2017-221728

(51) Int. Cl.
H01R 24/54    (2011.01)
H01R 13/6596  (2011.01)
H01R 13/74    (2006.01)
H01R 13/52    (2006.01)
H01R 31/06    (2006.01)
(Continued)

(52) U.S. Cl.
CPC .......... *H01R 24/54* (2013.01); *H01R 13/521* (2013.01); *H01R 13/5202* (2013.01); *H01R 13/6596* (2013.01); *H01R 13/743* (2013.01); *H01R 31/06* (2013.01); *H04N 5/232* (2013.01); *H04N 7/10* (2013.01); *H01R 13/405* (2013.01); *H01R 24/52* (2013.01); *H01R 2103/00* (2013.01); *H04N 5/2252* (2013.01); *H04N 5/22521* (2018.08)

(58) Field of Classification Search
None
See application file for complete search history.

(56) References Cited

U.S. PATENT DOCUMENTS 5,681,186 A     10/1997  Wright
7,171,769 B2 *  2/2007   Schultz ............... B60D 1/36
                                              172/272
(Continued)

FOREIGN PATENT DOCUMENTS

EP   0 794 596 A2    9/1997
JP   2015-210292 A   11/2015
TW   201 010 195 A   3/2010

OTHER PUBLICATIONS

European Search Report from EP18197028.6 dated Feb. 27, 2019.
U.S. Appl. No. 15/634,446, filed Jun. 27, 2017.

*Primary Examiner* — Jefferey F Harold
*Assistant Examiner* — Mustafizur Rahman
(74) *Attorney, Agent, or Firm* — Dilworth & Barrese, LLP

(57) ABSTRACT

A connector module that has an inexpensive configuration and a high shielding ability is provided. The connector module includes a terminal module and a shield case. The terminal module has a central conductor, a tubular insulator holder that supports the central conductor, and a tubular conductive shell. A bottom portion of the shield case has multiple elastic portions that are capable of elastic deformation and are bent from and protrude from an edge portion of an opening portion for passage of the terminal module. The terminal module is joined to the shield case in a state where the annular recession portion of the conductive shell and the elastic portions are in electrical contact with each other.

9 Claims, 7 Drawing Sheets

(51) Int. Cl.
*H04N 5/232* (2006.01)
*H04N 7/10* (2006.01)
*H01R 24/52* (2011.01)
*H04N 5/225* (2006.01)
*H01R 13/405* (2006.01)
*H01R 103/00* (2006.01)

(56) References Cited

U.S. PATENT DOCUMENTS

| | | | |
|---|---|---|---|
| 10,447,902 B2* | 10/2019 | Grimes | H04N 5/2257 |
| 2002/0003571 A1* | 1/2002 | Schofield | B60R 1/00 |
| | | | 348/148 |
| 2009/0174775 A1* | 7/2009 | Okamoto | B60R 1/00 |
| | | | 348/148 |
| 2010/0097519 A1* | 4/2010 | Byrne | B60R 1/00 |
| | | | 348/373 |
| 2011/0096524 A1* | 4/2011 | Kameyama | H01R 13/506 |
| | | | 361/818 |
| 2011/0310248 A1* | 12/2011 | McElroy | H04N 5/2254 |
| | | | 348/148 |
| 2013/0107068 A1* | 5/2013 | Kim | G03B 5/00 |
| | | | 348/208.11 |
| 2013/0222595 A1* | 8/2013 | Gebauer | H04N 5/217 |
| | | | 348/148 |
| 2013/0229519 A1* | 9/2013 | Kavuru | B60R 11/04 |
| | | | 348/148 |
| 2013/0242099 A1* | 9/2013 | Sauer | H04N 5/2257 |
| | | | 348/148 |
| 2013/0314964 A1* | 11/2013 | Yoshikawa | H01F 37/00 |
| | | | 363/131 |
| 2014/0103624 A1* | 4/2014 | Breed | B60R 21/0132 |
| | | | 280/728.3 |
| 2014/0362209 A1* | 12/2014 | Ziegenspeck | H04N 7/10 |
| | | | 348/113 |
| 2015/0002673 A1* | 1/2015 | Yamada | B60R 11/04 |
| | | | 348/148 |
| 2015/0222795 A1* | 8/2015 | Sauer | H04N 5/2257 |
| | | | 348/148 |
| 2015/0264234 A1* | 9/2015 | Wang | H04N 5/2254 |
| | | | 348/148 |
| 2015/0266430 A1* | 9/2015 | Mleczko | B60R 11/04 |
| | | | 348/148 |
| 2015/0327377 A1 | 11/2015 | Mano et al. | |
| 2016/0134830 A1* | 5/2016 | Stewart, II | B60R 1/001 |
| | | | 386/230 |
| 2017/0271819 A1* | 9/2017 | Hehir | H01R 13/6583 |
| 2018/0164528 A1* | 6/2018 | Sakamoto | G02B 7/02 |

\* cited by examiner

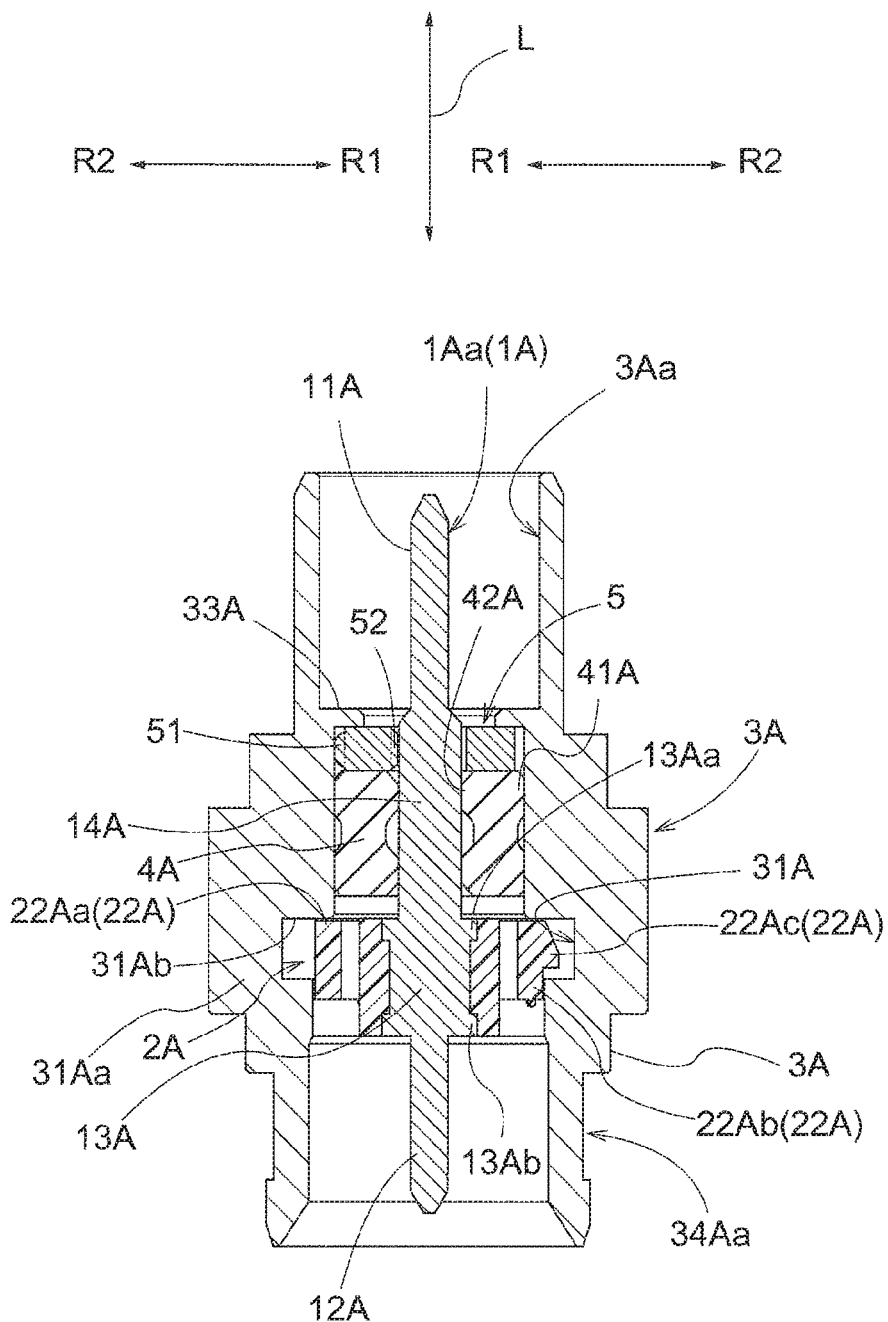

CONNECTOR MODULE AND ONBOARD CAMERA USING THE SAME

CROSS REFERENCE TO RELATED APPLICATION

This application is based on and claims priority under 35 U.S.C. Section 119 to Japanese Patent Application No. 2017-192413 filed on Oct. 2, 2017 and Japanese Patent Application No. 2017-221728 filed on Nov. 17, 2017, the entire content of which are incorporated herein by reference.

TECHNICAL FIELD

This disclosure relates to a connector module that has a shield case, and also to an onboard camera that uses the connector module.

RELATED ART

JP 2015-210292A discloses a plug that is used for connecting a coaxial cable to a receptacle provided in an electronic circuit unit. The coaxial cable referred to here is a cable that has an internal conductor, an external conductor that surrounds the internal conductor and shields the internal conductor from electromagnetic noise, and a dielectric (insulator) that is arranged between the internal conductor and the external conductor.

The plug includes an inner contact for connection with the internal conductor of the coaxial cable, and an outer contact and a shell for connection with the external conductor of the coaxial cable. The electronic circuit unit has a shield case for shielding the circuitry from electromagnetic noise, and the receptacle provided in the electronic circuit unit has a connection terminal for connection with a circuit ground. The outer contact of the plug is electrically connected to the circuit ground by being connected to the connection terminal of the receptacle. The shell of the plug comes into contact with, at a predetermined contact pressure, and is in electrical conduction with the shield case via a wave washer. In other words, the shield case improves the shielding ability by being connected to the ground via the plug. Also, JP 2015-210292A discloses a configuration that does not make use of a wave washer, that is to say a configuration in which multiple arm portions, which are separated from each other by slits, are formed in the edge portion of an opening formed in the center of a bottom portion of a shield case, and the arm portions are pressed by a leading end portion of the shell.

SUMMARY

However, the technology disclosed in JP 2015-210292A has a risk of an increase in manufacturing cost due to the fact that the number of parts increases due to the use of a wave washer. Also, the wave washer does not have a completely flat shape, and therefore the area of contact between the shield case and the shell of the plug is uneven, and there is a risk of degradation in the shielding effect.

Also, in the case where arm portions formed at the center of the bottom portion of the shield case are pressed by the leading end portion of the shell, if the position of the shield case becomes misaligned, the area of contact between the shield case and the shell of the plug becomes uneven, and there is a risk of degradation in the shielding effect.

In view of this, there is desire for the provision of a connector module that has an inexpensive configuration and a high shielding ability.

One aspect of a connector module achieved in light of the foregoing is a connector module including: a terminal module having a central conductor that has a straight linear portion and is capable of transmitting a signal, an insulator holder that has, in a center, a through-hole for passage of the straight linear portion, and that is shaped as a tube and supports the central conductor while covering at least a portion of the straight linear portion, and a conductive shell that is shaped as a tube and covers an outward diameter direction side of the insulator holder; and a shield case that is electrically conductive, is shaped as a bottomed tube capable of being engaged with the terminal module, and shields an interior space from electromagnetic waves that propagate in an exterior space around the shield case, wherein the shield case has a bottom portion that extends orthogonal to a first direction that conforms to an extending direction of the straight linear portion, and a side wall portion that is bent from a periphery of the bottom portion and extends along the first direction, the bottom portion has an opening portion for passage of the terminal module, and a plurality of elastic portions that are capable of elastic deformation and are bent from an edge portion of the opening portion and project in the first direction, the shield case is engaged with the conductive shell of the terminal module with use of the elastic portions, and an annular recession portion is formed in a portion of the conductive shell that is engaged to the elastic portions, the annular recession portion being in contact with and electrically connected to the elastic portions.

According to this aspect, the annular recession portion of the conductive shell and the elastic portions of the shield case are engaged in a state of being in electrical contact with each other, without a component such as a wave washer being interposed therebetween. As a result, even if the position of the shield case becomes misaligned, the side wall of the annular recession portion abuts against the elastic portions, thus making it possible to favorably maintain contact between the conductive shell and the shield case. In this way, according to this aspect, it is possible to provide a connector module that has an inexpensive configuration and a high shielding ability.

Also, it is preferable that the plurality of elastic portions are configured with mutually identical shapes, and are arranged with equal gaps therebetween in a circumferential direction.

If the elastic portions have mutually identical shapes and are arranged with equal gaps therebetween in the circumferential direction as in the above aspect, the paths of current flowing to the elastic portions are uniform, thus making it possible to improve the shielding effect.

Also, it is preferable that the terminal module further has an annular inner seal member that is a circular ring-shaped member, and that seals an interior of the terminal module in a state where an outer circumferential portion on the outward diameter direction side presses against an inner circumferential surface of the conductive shell, and an inner circumferential portion on an inward diameter direction side presses against the central conductor.

By providing the inner seal member inside the terminal module, it is possible to suppress the intrusion of a liquid such as water droplets into a component inside the terminal module, such as the central conductor, and it is possible to improve the reliability of the connector module.

Also, it is preferable that a plurality of first annular protruding portions that press against the inner circumferential surface of the conductive shell are formed on the outer circumferential portion of the inner seal member, a plurality of second annular protruding portions that press against the outer circumferential surface of the central conductor are formed on the inner circumferential portion of the inner seal member, and a pair of one of the first annular protruding portions and one of the second annular protruding portions are arranged coplanar in a diameter direction.

If a first annular protruding portion and a second annular protruding portion are arranged coplanar as in the above aspect, the inward diameter direction force applied to the first annular protruding portion by the conductive shell cancels out the outward diameter direction force applied to the second annular protruding portion by the central conductor, thus making it possible to minimize deformation of the inner seal member and maintain the shielding performance. Also, by providing multiple first annular protruding portions and multiple second annular protruding portions, even if one of the annular protruding portions deforms such that the water-proofing performance thereof degrades, the overall water-proofing performance can be ensured by another annular protruding portion.

Also, it is preferable that the conductive shell has an inner extending portion that extends in the inward diameter direction from an inner circumferential surface, and the terminal module further has a tilt preventing member that is shaped as a circular ring, is arranged at a position sandwiched between the inner seal member and the inner extending portion, and prevents tilting of the central conductor.

By providing the tilt preventing member that prevents tilting of the central conductor as in the above aspect, it is possible to prevent tilting of the central conductor even if the first direction length of the tubular insulator holder that supports the central conductor is short. Also, this tilt preventing member is sandwiched between the inner extending portion and the inner seal member, thus preventing positional shifting of the tilt preventing member itself. Accordingly, even if the connector module is given a compact configuration, it is possible to prevent axial shifting of the central conductor.

Also, it is preferable that the insulator holder has an engaging portion on a rear end side with respect to a direction of insertion into the conductive shell, the engaging portion protruding in the outward diameter direction and being capable of elastic deformation, and the conductive shell has an engaging recession portion that engages with the engaging portion.

In this aspect, the insulator holder has the engaging portion on the rear end side with respect to the direction of insertion into the conductive shell, and the engaging portion protrudes in the outward diameter direction and is capable of elastic deformation. For this reason, the engaging portion elastically deforms in the inward diameter direction as the insulator holder is inserted into the conductive shell, and upon reaching the engaging recession portion of the conductive shell, the engaging portion returns in the outward diameter direction, and the projecting portion and the engaging recession portion engage with each other. For this reason, the assembly of the insulator holder and the conductive shell is easy, and due to a portion of the engaging portion that protrudes in the outward diameter direction abutting against a side wall of the engaging recession portion, it is possible to prevent the insulator holder from coming out of the conductive shell. Accordingly, the shielding effect of the conductive shell can be ensured over a long period of time.

Also, it is preferable that a partition wall is formed on a bottom side of the engaging recession portion.

If the engaging recession portion formed in the conductive shell is constituted by a through-hole, there is a risk that electromagnetic noise from the outside will intrude into the conductive shell through the through-hole and become included in the transmitted signal. However, in the above aspect, the bottom side of the engaging recession portion is provided with a partition wall instead of a through-hole, thus having a bottom, and this makes it possible to prevent the above problem that occurs when a through-hole is formed.

Also, it is preferable that an annular projecting portion that projects in the outward diameter direction is formed on the straight linear portion that is covered by the insulator holder, and the annular projecting portion is integrated with the insulator holder.

In the above aspect, the annular projecting portion is formed in the straight linear portion of the central conductor, and the annular projecting portion is integrated with the insulator holder, thus reliably preventing the central conductor from coming out. Accordingly, the shielding effect of the conductive shell can be ensured over a long period of time.

In recent years, cameras are often installed in vehicles in order to assist driving and record the traveling state. Such a camera is often installed on the exterior of the vehicle, such as on the bumper, door, or the like, and an image processing device or a monitor device is often installed inside the vehicle. Accordingly, the camera is often connected to the image processing device or the monitor device with use of a cable or the like. The above-described connector module is used for connecting such a cable, and is favorable for configuring an onboard camera.

One aspect of such an onboard camera includes: the connector module of any of the above aspects; and a camera module that is connected to the connector module and has a imaging element, an electronic circuit that controls driving of the imaging element and processes a video signal output from the imaging element, and an optical system that includes a lens that condenses light onto the imaging element, wherein the central conductor is electrically connected to the electronic circuit, and at least a portion of the electronic circuit is shielded by the shield case.

BRIEF DESCRIPTION OF THE DRAWINGS

FIG. 8 shows a longitudinal cross-section of the other example of the terminal module.

DESCRIPTION OF EMBODIMENTS

Figure 2:
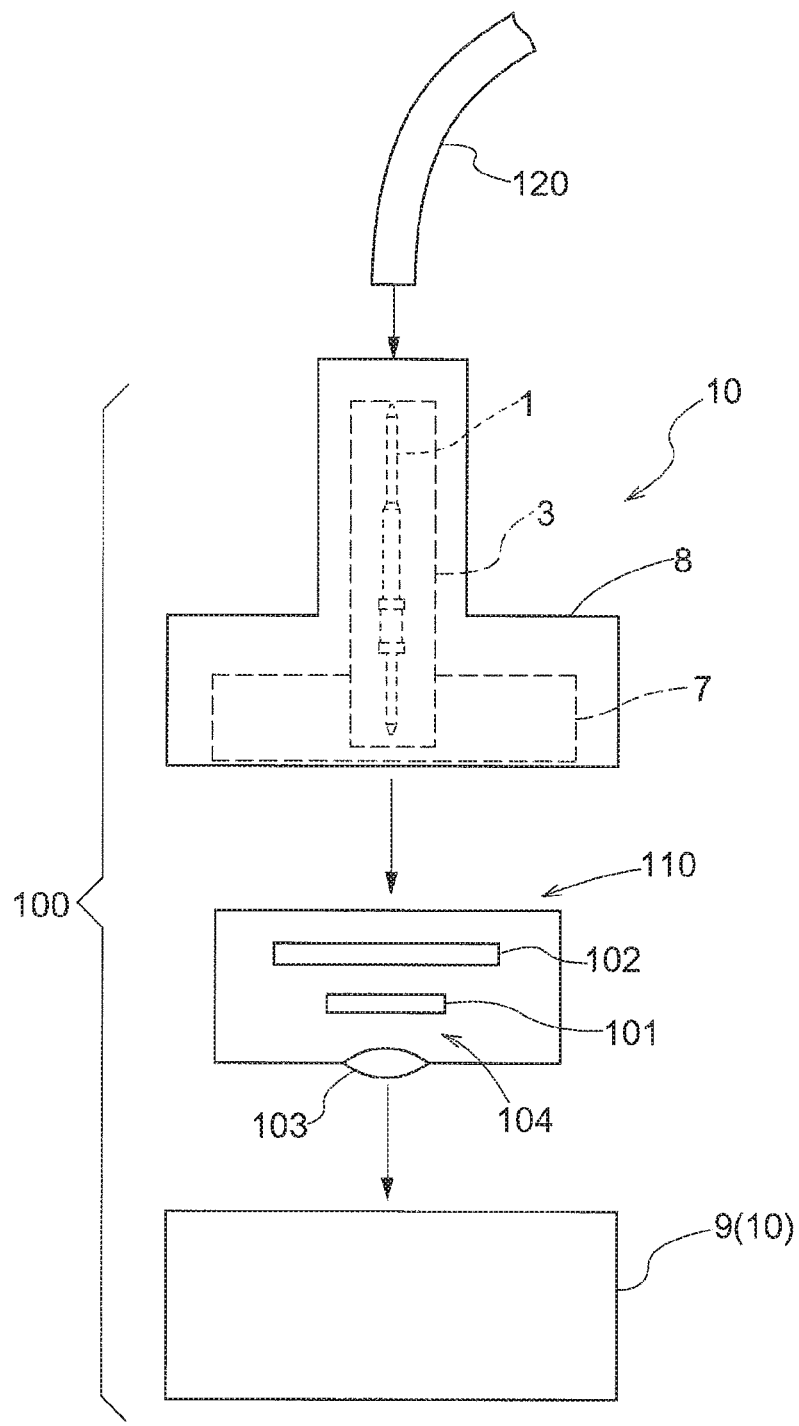
FIG. 2 is a diagram schematically showing a configuration of a camera unit (onboard camera)

Hereinafter, an embodiment of a connector module 10 will be described with reference to the drawings. The present embodiment describes an example in which the connector module 10 is used in a camera unit 100 (onboard camera) that is for installation in a vehicle, as schematically shown in FIG. 2. This camera unit 100 can also be used in applications other than vehicle installation (e.g., installation in a bicycle, drone, or the like). The camera unit 100 has a camera module 110 and the connector module 10. The camera module 110 has at least an imaging element 101, an electronic circuit 102 that controls driving of the imaging element 101 and processes a video signal output from the imaging element 101, and an optical system 104 that includes a lens 103 for condensing light onto the imaging element 101.

The camera unit 100 is connected to an image processing device (not shown) or a monitor device (not shown) by a coaxial cable 120. The coaxial cable 120 is a cable having a structure in which an internal conductor and an external conductor are arranged coaxially with a dielectric (insulator) sandwiched therebetween. The internal conductor transmits signals, and the external conductor functions as a shield for suppressing influence on the internal conductor from electromagnetic waves. In the present embodiment, the internal conductor supplies electrical power from the image processing device or the monitor device to the imaging element 101 and the electronic circuit 102 of the camera unit 100, and also outputs a video signal output from the imaging element 101 and the electronic circuit 102 to the image processing device or the monitor device. In other words, the camera unit 100 is an image capturing device that employs a known power supply multiplex system.

The imaging element 101 of the camera module 110 is a CCD (Charge Coupled Device) sensor or a CIS (CMOS Image Sensor). The lens 103 is not limited to being a single lens, and may include multiple lenses. The electronic circuit 102 includes a clock driver for driving the imaging element 101, and an analog signal processing circuit for performing analog signal processing such as sample holding and clamp processing on an analog signal output from the imaging element 101. The electronic circuit 102 may also include an A/D converter for converting the analog signal into a digital signal. The electronic circuit 102 may also have a power supply circuit for performing processing such as rectification on electrical power supplied by a power supply multiplex system.

Note that the electronic circuit 102 is configured as a circuit board, in which electronic components are mounted onto one or more printed boards. In the case of having multiple circuit boards, a flexible board may be used for electrical connection between circuit boards. A receptacle (not shown) is mounted to the circuit board on which the electronic circuit 102 is formed. The connector module 10 is electrically connected to the electronic circuit 102 and the coaxial cable 120 by being connected to the receptacle and also being connected to the coaxial cable 120.

Figure 1:
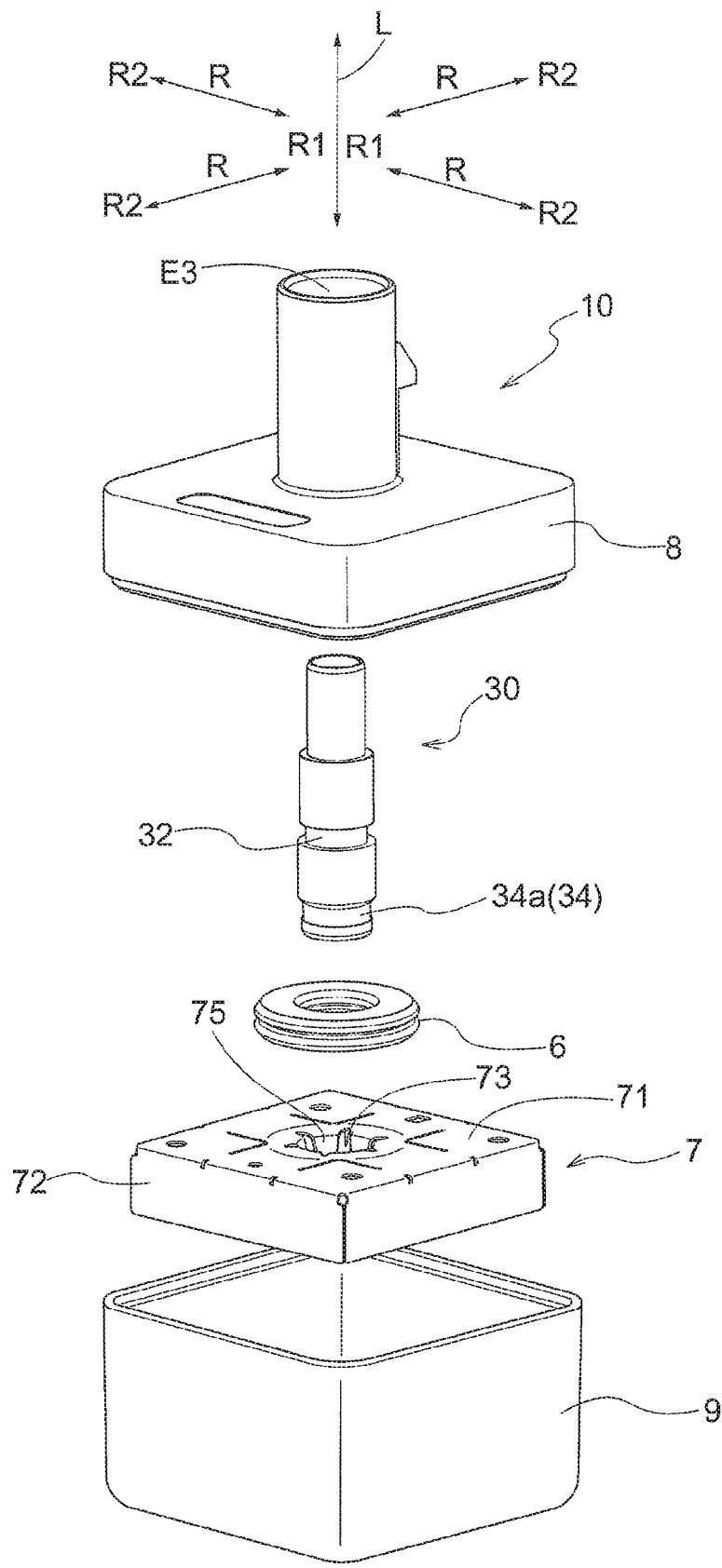
FIG. 1 is an exploded perspective view of a connector module.

FIG. 1 is an exploded perspective view of the connector module 10. The connector module 10 has a connector case 8, a terminal module 30, a shield case 7, a main body case 9, and an outer seal member 6. Also, as shown in the exploded perspective view of FIG. 3, the terminal module 30 has a central conductor 1, an insulator holder 2, a conductive shell 3, and an inner seal member 4. The terminal module 30 has functions similar to the coaxial cable 120. The central conductor 1 corresponds to the internal conductor of the coaxial cable 120, the insulator holder 2 corresponds to the dielectric (insulator) of the coaxial cable 120, and the conductive shell 3 corresponds to the external conductor of the coaxial cable 120. The characteristic impedance of the terminal module 30 is preferably similar to that of the coaxial cable 120. In other words, the connector module 10 (terminal module 30) is set with a predefined characteristic impedance (e.g., 50 [Ω]) based on the outer diameter of the central conductor 1, the inner diameter of the conductive shell 3, and the dielectric constant of the insulator holder 2.

Returning to FIG. 1, the connector case 8 is a case for housing the terminal module 30, the shield case 7, and the outer seal member 6. The connector case 8 is located rearward of the camera module 110 in the camera unit 100, and therefore is sometimes called a rear case. The main body case 9 houses the camera module 110. The main body case 9 is sometimes called a front case, relative to the rear case, in the camera unit 100. The connector case 8 and the main body case 9 abut against each other and form therein a housing space for housing the terminal module 30, the shield case 7, the outer seal member 6, and the camera module 110.

Figure 4:
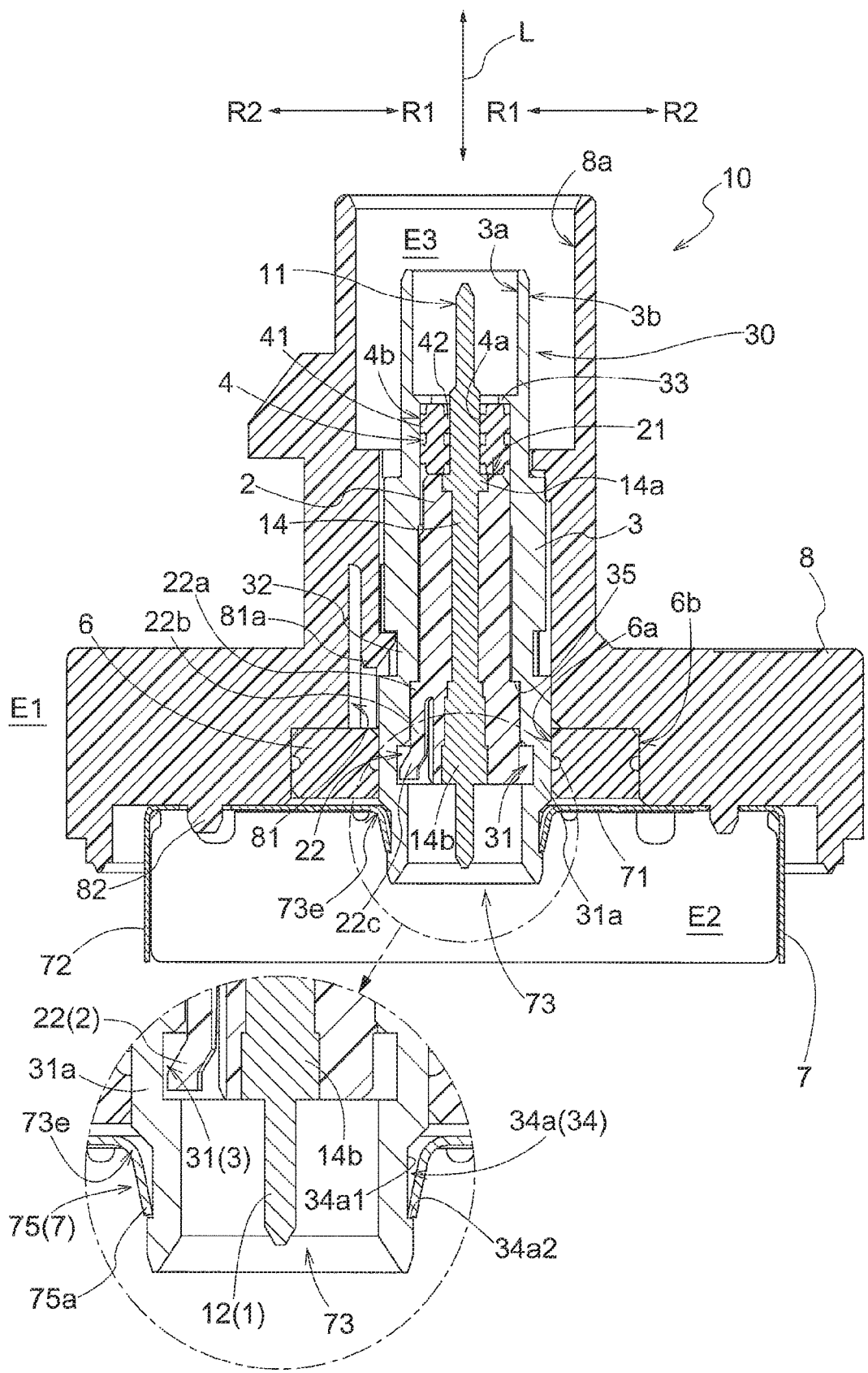
FIG. 4 shows a longitudinal cross-section of the connector module.

As shown in the longitudinal cross-section in FIG. 4, the shield case 7 shields an interior space E2 of the shield case 7 from electromagnetic waves that propagate in an exterior space E1 around the shield case 7. The shield case 7 covers at least a portion of the electronic circuit 102 of the camera module 110, and shields the electronic circuit 102 from electromagnetic waves such as electromagnetic noise. This shield case 7 is connected to a ground of the electronic circuit 102. The external conductor of the coaxial cable 120 is electrically connected to the conductive shell 3. Also, the shield case 7 and the conductive shell 3 are electrically connected as will be described later. Accordingly, when the shield case 7 is connected to the ground of the electronic circuit 102, the conductive shell 3 and the external conductor of the coaxial cable 120 are also electrically connected to the ground of the electronic circuit 102.

As described above, the camera unit 100 (onboard camera) includes the camera module 110 and the connector module 10, and the camera module 110 has the imaging element 101, the electronic circuit 102 that controls driving of the imaging element 101 and processes a video signal output from the imaging element 101, and the optical system 104 that has the lens 103 that condenses light onto the imaging element 101. Also, the central conductor 1 is electrically connected to the electronic circuit 102, and at least a portion of the electronic circuit 102 is shielded by the shield case 7. The following describes the connector module 10 in detail.

Figure 3:
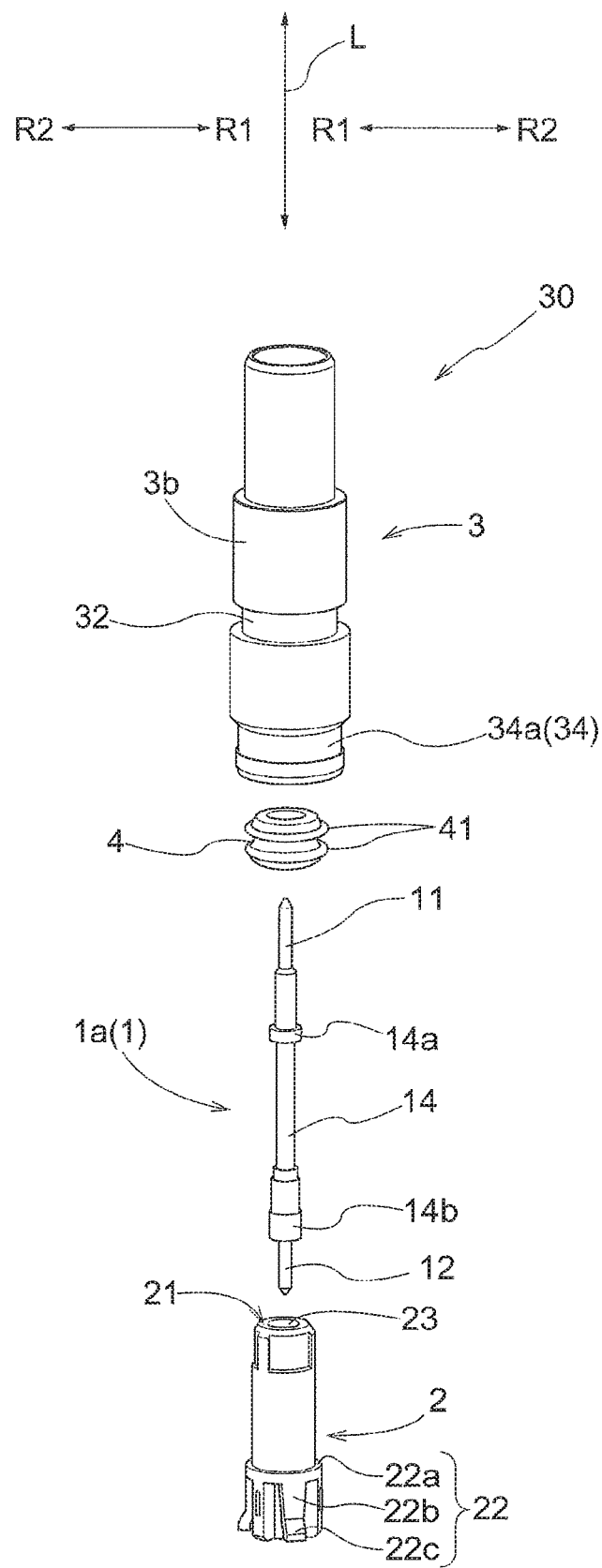
FIG. 3 is an exploded perspective view of a terminal module.

As described above, the terminal module 30 has the central conductor 1, the insulator holder 2, the conductive shell 3, and the inner seal member 4. As shown in FIG. 3, the central conductor 1 is a linear conductor that transmits signals. In the description of the present embodiment, the central conductor 1 is constituted by only a straight linear portion 1a, and the extending direction of the central conductor 1 is hereinafter called a first direction L. Also, the direction orthogonal to the first direction L is called a diameter direction R, the direction toward in the central conductor 1 in the diameter direction R is called an inward diameter direction R1, and the direction away from the central conductor 1 is called in an outward diameter direction R2.

The insulator holder 2 is a thick-walled cylindrical member that is made of resin or the like and is constituted by a circular column-shaped insulator that has a through-hole 23 (conductor through-hole), through which the central conductor 1 passes, formed in the center. The length of the insulator holder 2 in the first direction L is shorter than that of the central conductor 1. Accordingly, the insulator holder 2 supports the central conductor 1 while also covering a central portion 14 (main wire portion) of the central conductor 1 in the first direction L (extending direction of the central conductor 1) (see FIG. 4). Specifically, the two ends of the central conductor 1 are exposed instead of being covered by the insulator holder 2, and are respectively a first terminal portion 11 and a second terminal portion 12. As shown in FIGS. 3 and 4, the first terminal portion 11 is arranged on the coaxial cable 120 side, and the second terminal portion 12 is arranged on the camera module 110 side (e.g., the receptacle side). Although an exploded perspective view is shown in FIG. 3 for the sake of convenience, the central conductor 1 is insert-molded together with the insulator holder 2. A first annular projecting portion 14*a* and a second annular projecting portion 14*b* (examples of an annular projecting portion), which project in the outward diameter direction R2, are formed in respective end portions of the central portion 14 that is covered by the insulator holder 2. In this way, the annular projecting portions 14*a* and 14*b* are formed in respective end portions of the central portion 14 of the central conductor 1, and the central portion 14 is insert-molded with and integrated with the insulator holder 2, thus reliably suppressing the case where the central conductor 1 comes out of the insulator holder 2. Also, the outer diameter of the first terminal portion 11 and the second terminal portion 12 is set smaller than the outer diameter of the central portion 14. In this way, the straight linear portion 1*a* of the central conductor 1 is constituted by the first terminal portion 11, the second terminal portion 12, and the central portion 14. Note that a configuration is possible in which only either the first annular projecting portion 14*a* or the second annular projecting portion 14*b* is formed on the central conductor 1.

The end portion of the insulator holder 2 on the second terminal portion 12 side has multiple (three in the present embodiment) projecting pieces 22 that spread in the outward diameter direction R2 while extending toward the second terminal portion 12, and are capable of elastic deformation (see FIGS. 3 and 4). These projecting pieces 22 are configured as cantilevered beam-shaped arms that have a free end on the second terminal portion 12 side. The projecting pieces 22 each have a step-shaped base portion 22*a* that expands in the outward diameter direction R2, an extending portion 22*b* that extends from the base portion 22*a* toward the second terminal portion 12 in the first direction L, and a projecting portion 22*c* (one example of an engaging portion) that protrudes in the outward diameter direction R2 from the end portion of the extending portion 22*b* on the second terminal portion 12 side (the rear end side in the direction of insertion of the insulator holder 2 into the conductive shell 3). The projecting portions 22*c* elastically deform in the inward diameter direction R1 as the insulator holder 2 is inserted into the conductive shell 3, and upon reaching a later-described first engaging recession portion 31 (one example of an engaging recession portion) of the conductive shell 3, the projecting portions 22*c* return in the outward diameter direction R2, and the projecting portions 22*c* and the first engaging recession portion 31 engage with each other. For this reason, the assembly of the insulator holder 2 and the conductive shell 3 is easy, and by engaging the projecting pieces 22 with the first engaging recession portion 31 of the conductive shell 3, it is possible to prevent the insulator holder 2 from coming out of the conductive shell 3. Also, due to the base portions 22*a* of the projecting pieces 22 abutting against a later-described step-shaped portion 35 of the conductive shell 3, the insulator holder 2 is positioned when inserted into the conductive shell 3, and the insulator holder 2 is prevented from moving in the insertion direction.

The conductive shell 3 is a cylindrical member that covers the outward diameter direction R2 side of the insulator holder 2. The conductive shell 3 is made of a metal. The inner diameter of the conductive shell 3 is one of the parameters that define the characteristic impedance as described above, and an inner circumferential surface 3*a* is formed as a substantially even surface. It should be noted that as will be described later with reference to FIG. 4, an annular extending portion 33 (one example of an inner extending portion), which has an annular shape and extends in the inward diameter direction R1 from the inner circumferential surface 3*a*, is formed on a portion of the conductive shell 3 on the first terminal portion 11 side. Also, a first engaging recession portion 31, which is annular and recessed in the outward diameter direction R2 from the inner circumferential surface 3*a*, is formed in a portion on the second terminal portion 12 side. As described above, the projecting pieces 22 of the insulator holder 2 engage with this first engaging recession portion 31. The insulator holder 2 is fixed to the conductive shell 3 in this way.

A bottom wall 31*a* (one example of a partition wall) is integrated with the bottom side of the first engaging recession portion 31, thus preventing electromagnetic noise from intruding to the insulator holder 2 side. The first engaging recession portion 31 of the present embodiment is formed by cutting away a portion of the inner circumferential surface 3*a* of the conductive shell 3. Also, a step-shaped portion 35 that descends in the outward diameter direction R2 is formed between the annular extending portion 33 and the first engaging recession portion 31, and the above-described base portions 22*a* of the projecting pieces 22 abut against the step-shaped portion 35. Note that the annular extending portion 33 of the conductive shell 3 may have a configuration in which only a portion of the inner circumferential surface 3*a* projects in the inward diameter direction R1. Also, the bottom wall 31*a* of the first engaging recession portion 31 may be formed by fixing a separate member to the through-hole.

The conductive shell 3 is provided with a second engaging recession portion 32, which is annular and recessed in the inward diameter direction R1 from an outer circumferential surface 3*b* that is located in the central region. This second engaging recession portion 32 engages with later-described engaging claws 81*a* of the connector case 8, thus preventing the conductive shell 3 from coming out of the connector case 8. Also, a third engaging recession portion 34*a* (one example of an annular recession portion), which is annular and recessed in the inward diameter direction R1 from the outer circumferential surface 3*b*, is formed in a tubular end portion 34 of the conductive shell 3.

Figure 5:
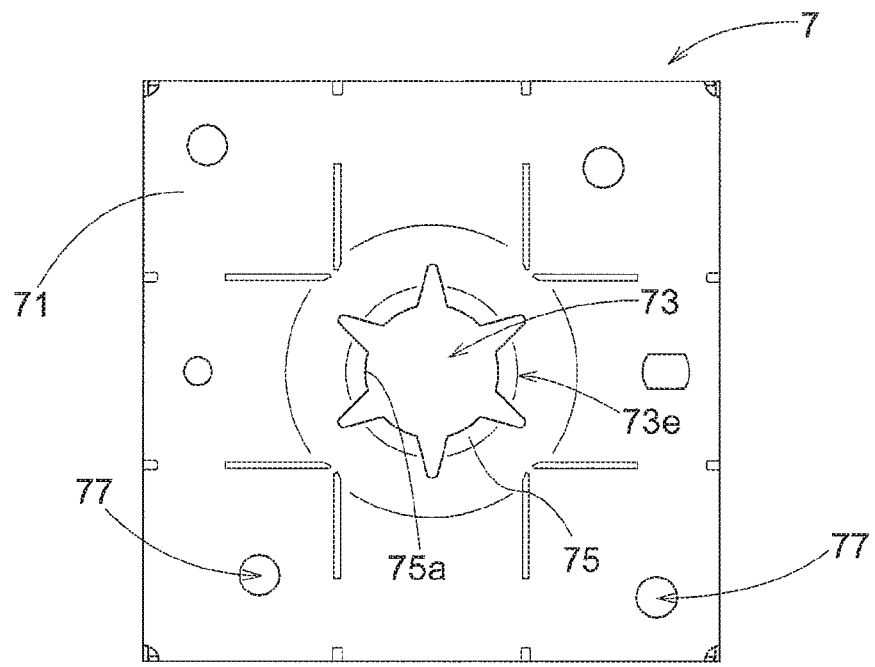
FIG. 5 is a plan view of a shield case.
Figure 6:
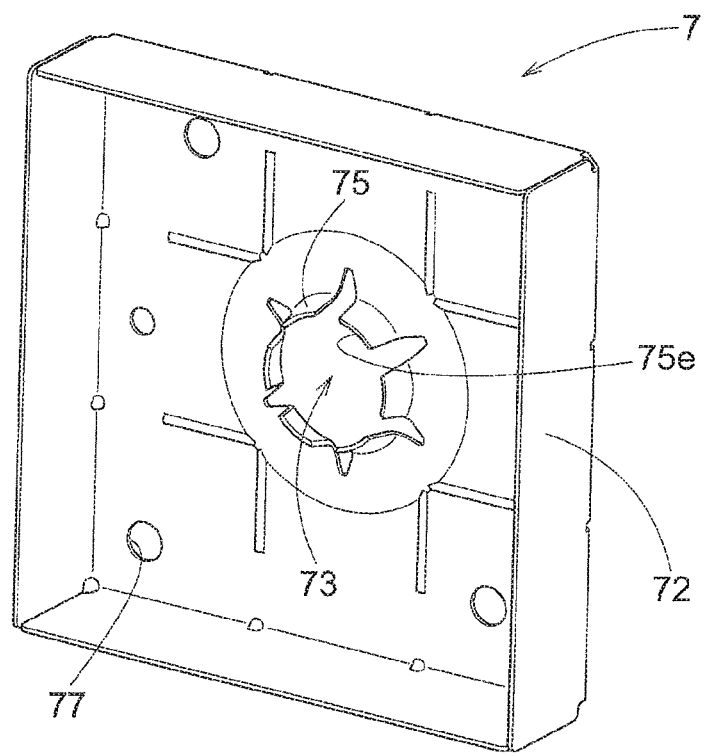
FIG. 6 is a perspective view of a back face of the shield case.

The shield case 7 is a case that is shaped as a bottomed rectangular tube. The shield case 7 shields the interior space E2 of the shield case 7 from the electromagnetic waves such as electromagnetic waves that are present in the exterior space E1 around the shield case 7, one example being electromagnetic noise that influences the electronic circuit 102 of the camera module 110, signals transmitted by the central conductor 1, and the like. To achieve this, the shield case 7 is also made of an electrically conductive material such as a metal. The shield case 7 has a bottom portion 71 that extends orthogonal to the first direction L conforming to the extending direction of the central conductor 1, and side wall portions 72 that are bent from the periphery of the bottom portion 71 and extend along the first direction L (the direction away from the terminal module 30 in the first direction L). As shown in FIGS. 4 to 6, the bottom portion 71 has an opening portion 73 through which the terminal module 30 (conductive shell 3) passes, and multiple (six in the present embodiment) elastic portions 75 that are bent from an end portion (opening edge portion 73*e*) of the opening portion 73, project along the first direction L (along the extending direction of the side wall portion 72) to form a cylindrical shape, and are capable of elastic deformation. Inner ends 75a of the elastic portions 75 each come into contact with a bottom portion 34a1 and one side wall 34a2 of the third engaging recession portion 34a, and thereby the shield case 7 and the terminal module 30 (conductive shell 3) are electrically connected to each other (see FIG. 4). In the present embodiment, the elastic portions 75 have the same shape as each other, namely a trapezoidal plate shape, and are arranged with equal gaps therebetween in the circumferential direction. Note that there are no particular limitations on the elastic portions 75, and they may have a triangular plate shape for example, and may have different shapes from each other and have different gaps therebetween.

As shown in FIGS. 1 and 4, the connector case 8 is a case that houses a portion of the shield case 7 and the terminal module 30. The connector case 8 has a cylindrical space E3 that surrounds the terminal module 30, and a rectangular tube-shaped space that houses a portion of the shield case 7. Because the outer surface of the terminal module 30 is the conductive shell 3, and the shield case 7 also has electrical conductivity, the connector case 8 is made of an insulating (non-conducting) material such as resin in order to insulate the conductive shell 3 and the shield case 7 from the outer portion of the connector module 10.

Multiple (four in the present embodiment) engaging grooves 81 are formed in an inner circumferential surface 8a of the connector case 8. Multiple (four in the present embodiment) engaging claws 81a, having leading ends that project in the inward diameter direction R1, are provided in the engaging grooves 81 so as to extend from the base end portion (side wall portion) toward the shield case 7 along the first direction L. As described above, these engaging claws 81a engage with the second engaging recession portion 32 of the conductive shell 3.

In the present embodiment, the tubular end portion 34 of the conductive shell 3 is press-fitted around the elastic portions 75 (see FIG. 4), and the third engaging recession portion 34a of the conductive shell 3 and the inner ends 75a of the elastic portions 75 are pressed against each other and electrically connected to each other. This appropriately suppresses the intrusion of electromagnetic waves from the exterior space E1 around the shield case 7 into the interior space E2, the leakage of electromagnetic waves from the interior space E2 to the exterior space E1, and the like. Note that the electrical connection of the conductive shell 3 and the shield case 7 is not limited to being press-fitting as described above. A configuration is possible in which the tubular end portion 34 of the conductive shell 3 is inserted around the elastic portions 75, and the conductive shell 3 and the shield case 7 are then connected by welding, adhering, or soldering the inner ends 75a of the elastic portions 75 to the third engaging recession portion 34a.

As shown in FIGS. 3 and 4, the inner seal member 4 has a sealing function for preventing the intrusion of a liquid or the like into the terminal module 30 that functions as a coaxial cable. The inner seal member 4 is a circular-ring shaped member that has elasticity (i.e., an elastic member). Multiple (two in the present embodiment) first annular protruding portions 41 for pressing against the inner circumferential surface 3a of the conductive shell 3, are formed on an outer circumferential portion 4b of the inner seal member 4 on the outward diameter direction R2 side. Also, multiple (two in the present embodiment) second annular protruding portions 42 for pressing against the central conductor 1, are formed on an inner circumferential portion 4a of the inner seal member 4 on the inward diameter direction R1 side. The first annular protruding portions 41 and the second annular protruding portions 42 are arranged coplanar with each other in the diameter direction R. If the first annular protruding portions 41 and the second annular protruding portions 42 are arranged coplanar with each other in the diameter direction R, the inward diameter direction R1 force applied to the first annular protruding portion 41 by the conductive shell 3 cancels out the outward diameter direction R2 force applied to the second annular protruding portion 42 by the central conductor 1, thus making it possible to minimize deformation of the inner seal member 4 and maintain the shielding performance. Also, by providing multiple first annular protruding portions 41 and multiple second annular protruding portions 42, even if one of the annular protruding portions 41 or 42 deforms such that the waterproofing performance thereof degrades, the overall water-proofing performance can be ensured by the other annular protruding portion 41 or 42.

As described above, the conductive shell 3 has the annular extending portion 33 that is annular and protrudes from the inner circumferential surface 3a. The inner seal member 4 is arranged in the terminal module 30 by the face of the inner seal member 4 on one side in the first direction L being locked by the annular extending portion 33, and the face on the other side being locked by an end face 21 of the insulator holder 2 in the first direction L.

In this way, in the terminal module 30, one side of the inner seal member 4 abuts against the annular extending portion 33, the other side of the inner seal member 4 abuts against the insulator holder 2 that supports the central conductor 1, and the projecting pieces 22 of the insulator holder 2 engage with the first engaging recession portion 31 of the conductive shell 3. In other words, in the terminal module 30, the inner seal member 4 and the insulator holder 2 are arranged at defined positions in a direction along the first direction L while being sandwiched by the annular extending portion 33 and the projecting pieces 22 of the insulator holder 2.

The terminal module 30 formed in this way is electrically connected to the shield case 7. The intermediate assembled product obtained by joining of the terminal module 30 and the shield case 7 will be called the terminal module assembly as appropriate. The terminal module assembly is attached to the connector case 8.

The terminal module assembly can be housed in the connector case 8 by inserting the terminal module 30 side of the terminal module assembly through the rectangular tube-shaped space toward the cylindrical space E3 of the connector case 8 along the first direction L. At this time, hole portions 77 (see FIGS. 4 to 6) formed in the bottom portion 71 of the shield case 7 are positioned by insertion of protrusion portions 82 of the connector case 8, and the engaging claws 81a of the connector case 8 engage with the second engaging recession portion 32 of the conductive shell 3. This consequently restricts movement of the terminal module 30 along the first direction L relative to the connector case 8. Also, in order to suppress the intrusion of a liquid into the cylindrical space E3 of the connector case 8, the outer seal member 6 is attached in the cylindrical space E3. In the present embodiment, the outer seal member 6 is arranged so as to abut against the bottom portion 71 of the shield case 7 in the first direction L. Similarly to the inner seal member 4, the outer seal member 6 is also a circular-ring shaped member that has elasticity (i.e., an elastic member). An outer circumferential portion 6b of the outer seal member 6 on the outward diameter direction R2 side presses against the inner circumferential surface 8a of the connector case 8 that forms the cylindrical space E3. Also, an inner circumferential portion 6a of the outer seal member 6 on the inward diameter direction R1 side presses against the outer circumferential surface 3b of the conductive shell 3.

In the case where the connector module 10 is used in a camera unit 100 that serves as an onboard camera as in the present embodiment, effective sealing can be performed with use of the inner seal member 4 and the outer seal member 6. The camera unit 100 that serves as an onboard camera is often used for driving assistance, traveling state recording, and the like. In this case, the camera unit 100 is often installed on the exterior of the vehicle, such as on the bumper, door, or the like. The exterior of the vehicle is likely to be subjected to water droplets from rain, snow, road puddles, and the like. Accordingly, it is preferable to provide the connector module 10 with water-proofing capability by performing the sealing described above.

The assembled product obtained by the terminal module 30 and the shield case 7 being housed in and fixed to the connector case 8 is the connector module 10 in a narrow sense. This connector module 10 in a narrow sense may also be called the connector module 10 including the main body case 9. It should be noted that in the case of including the main body case 9, it is possible for the camera module 110 to be housed in the main body case 9. In this case, the connector module 10 is substantially synonymous with the camera unit 100. Accordingly, the connector module 10 can correspond to the assembled product obtained by the terminal module 30 and the shield case 7 being housed in and fixed to the connector case 8, the intermediate assembled product that further includes the main body case 9, or the camera unit 100 that houses the camera module 110. Unless particularly stated otherwise, in the present embodiment, the assembled product obtained by the terminal module 30 and the shield case 7 being housed in and fixed to the connector case 8 is called the connector module 10.

Note that although the above illustrates an aspect in which the terminal module assembly is attached to the connector case 8 to obtain the assembled connector module 10, there is no limitation to this aspect. For example, the connector case assembly can be configured by attaching only the terminal module 30 to the connector case 8. Also, the connector module 10 may be assembled by joining the shield case 7 and the conductive shell 3 of the connector case assembly. Moreover, the connector module 10 may be assembled by attaching only the conductive shell 3 to the connector case 8, then attaching the inner seal member 4 and the insulator holder 2 holding the central conductor 1 to the conductive shell 3 in this order, and then joining the connector case 8 to the shield case 7. Although the case of placing the central conductor 1 in the insulator holder 2 first is illustrated here, a configuration is possible in which the insulator holder 2 is inserted into the conductive shell 3, and thereafter the central conductor 1 is inserted into the through-hole 23 of the insulator holder 2.

In this way, the connector module 10 can be assembled without using a washer or the like, with a small number of components, and with a small number of steps. In other words, according to the present embodiment, it is possible to realize the connector module 10 that has a small number of components, has a high shielding ability, and is capable of connecting the coaxial cable 120 and a circuit unit (camera unit 100). Also, in the present embodiment, the third engaging recession portion 34a of the conductive shell 3 and the elastic portions 75 of the shield case 7 are engaged in an electrically connected state. As a result, even if the position of the shield case 7 becomes misaligned, the side wall 34a2 of the third engaging recession portion 34a abuts against the inner ends 75a of the elastic portions 75, thus making it possible to favorably maintain contact between the conductive shell 3 and the shield case 7. Furthermore, the elastic portions 75 have the same shape and are arranged with equal gaps therebetween in the circumferential direction, and therefore the paths of current flowing to the elastic portions 75 are uniform, and it is possible to improve the shielding effect.

Other Embodiments

The following describes other embodiments. Note that the configurations of various embodiments are not limited to being applied on their own, and can be applied in combination with the configurations of other embodiments as long as no contradiction arises. Also, members having functions similar to those of the above embodiment will be described using the same names, and detailed descriptions will not be given for them.

Figure 7:
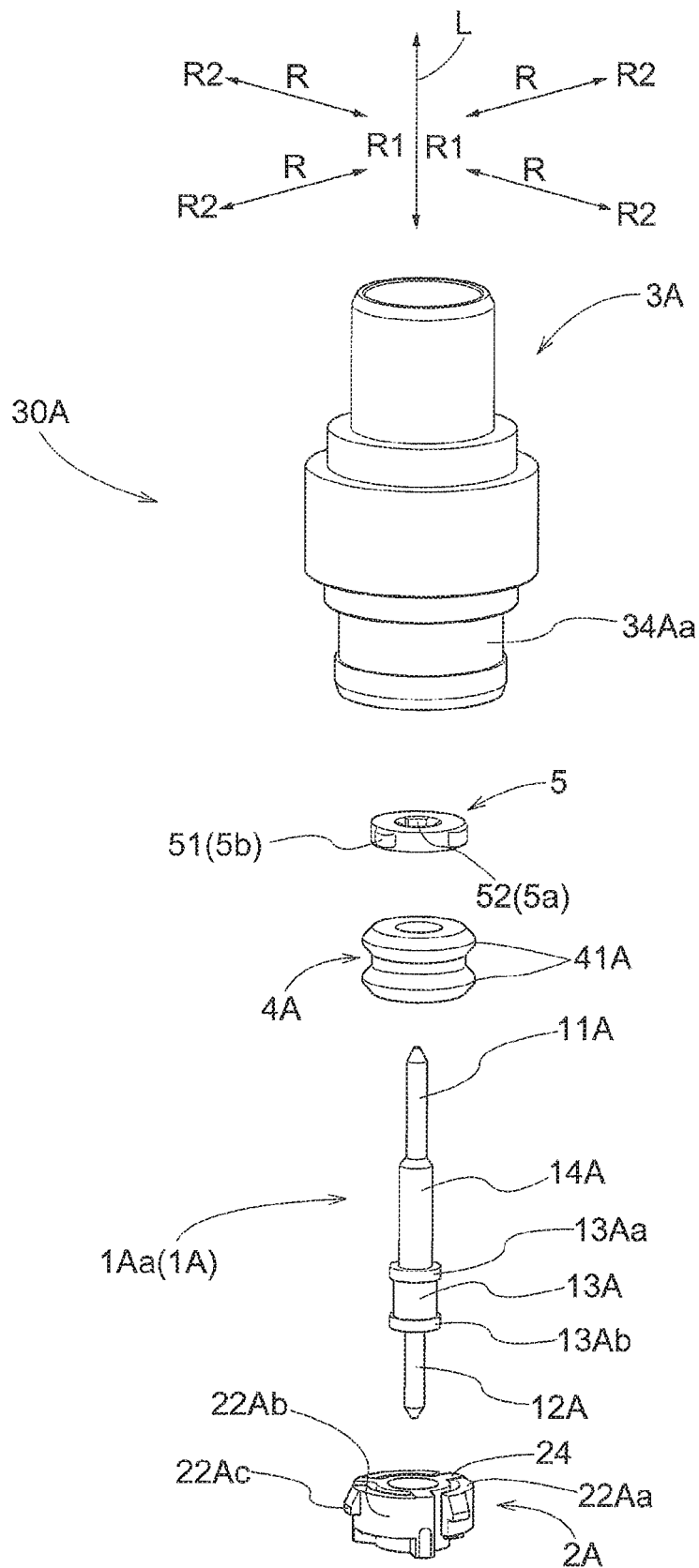
FIG. 7 is an exploded perspective view of another example of the terminal module.

(1) FIGS. 7 and 8 show a terminal module 30A according to another embodiment. An insulator holder 2A of the present embodiment is constituted with a smaller dimension in the first direction L than that of the insulator holder 2 of the terminal module 30 in the embodiment described above. Accordingly, the dimensions of a central conductor 1A of the present embodiment are also smaller than the dimensions of the central conductor 1 in the embodiment described above. For this reason, the region along the first direction L in which the central conductor 1A is supported by the insulator holder 2A is smaller, and there is a risk of tilting of the central conductor 1A. In view of this, the terminal module 30A of the present embodiment has a tilt preventing member 5 that prevents tilting of the central conductor 1A and is provided between an inner seal member 4A and a annular extending portion 33A of a conductive shell 3A.

Specifically, the terminal module 30A of the present embodiment has the central conductor 1A, the insulator holder 2A, the conductive shell 3A, the inner seal member 4A, and the tilt preventing member 5.

A straight linear portion 1Aa of the central conductor 1A is constituted by a first terminal portion 11A, a second terminal portion 12A, an increased diameter portion 13A, and a central portion 14A. The central conductor 1A is supported by the insulator holder 2A by the increased diameter portion 13A coming into close contact with the inner circumferential surface of the insulator holder 2A. Although an exploded perspective view is shown in FIG. 7 for the sake of convenience, the central conductor 1A is insert-molded together with the insulator holder 2A. Similarly to the embodiment described above, a first annular projecting portion 13Aa and a second annular projecting portion 13Ab (examples of an annular projecting portion), which project in the outward diameter direction R2, are formed in respective end portions of the increased diameter portion 13A of the central conductor 1A, and the central conductor 1A is thus prevented from coming out of the insulator holder 2A.

Multiple (three in the present embodiment) projecting pieces 22A that are capable of elastic deformation are provided in the end portion of the insulator holder 2A on the first terminal portion 11A side. These projecting pieces 22A are configured as cantilevered beam-shaped members that have free ends extending in the circumferential direction from multiple (three in the present embodiment) projecting portions 24 that project from the outer circumferential surface of the insulator holder 2A on the outward diameter direction R2 side with equal gaps therebetween. The projecting pieces 22 each have an abutting face 22Aa for abutting against a side face 31Ab on the first terminal portion 11A side of a later-described first engaging recession portion 31A of the conductive shell 3A, an extending portion 22Ab that extends from the projecting portion 24 in the circumferential direction, and a projecting portion 22Ac (one example of an engaging portion) that protrudes in the outward diameter direction R2 from the end portion of the extending portion 22Ab on the rear end side in the direction of insertion of the insulator holder 2A into the conductive shell 3A.

A first engaging recession portion 31A (one example of an engaging recession portion), which is annular and recessed in the outward diameter direction R2 from an inner circumferential surface 3Aa, is formed in a portion of the conductive shell 3A on a second terminal portion 12A side. Similarly to the embodiment described above, when the insulator holder 2A is inserted into the conductive shell 3A, the projecting portions 22Ac of the insulator holder 2A engage with the first engaging recession portion 31A, thus preventing the insulator holder 2A from coming out of the conductive shell 3A. Also, due to the abutting face 22Aa of the insulator holder 2A abutting against the side face 31Ab of the first engaging recession portion 31A of the conductive shell 3A, the insulator holder 2A is positioned when inserted into the conductive shell 3A, and the insulator holder 2A is prevented from moving in the insertion direction. Furthermore, a bottom wall 31Aa (one example of a partition wall) is integrated with the bottom side of the first engaging recession portion 31A, thus preventing electromagnetic noise from intruding to the insulator holder 2A side. Note that a third engaging recession portion 34Aa (one example of an annular recession portion) that is recessed with an annular shape and is for engagement with the elastic portion 75 is formed in the conductive shell 3A, but this is similar to the embodiment described above, and will not be described in detail.

Similarly to the embodiment described above, the inner seal member 4A is provided with multiple (two in the present embodiment) first annular protruding portions 41A that press against the inner circumferential surface 3Aa of the conductive shell 3, and multiple (two in the present embodiment) second annular protruding portions 42A that press against the central conductor 1. The first annular protruding portions 41A and the second annular protruding portions 42A of the present embodiment are formed with an inclined-face donut shape and are continuous with the end faces. Accordingly, the axial length of the inner seal member 4A can be made compact.

The tilt preventing member 5 is a circular-ring shaped insulating member that has elasticity (i.e., an elastic member). Multiple (three in the present embodiment) first projections 51 are formed on an outer circumferential portion 5b of the tilt preventing member 5 with equal gaps therebetween in the circumferential direction. Also, multiple (three in the present embodiment) second projections 52 are formed on an inner circumferential portion 5a of the tilt preventing member 5 at positions according to which they have the same straight line shape relative to the diameter direction R from the center. As shown in FIG. 8, the first projections 51 on the outward diameter direction R2 side of the tilt preventing member 5 press against the inner circumferential surface 3Aa of the conductive shell 3A. Also, the second projections 52 on the outward diameter direction R2 side of the tilt preventing member 5 press against the central conductor 1A. Due to being an elastic member, the tilt preventing member 5 flexibly deforms according to the inner diameter of the conductive shell 3A and the outer diameter of the central conductor 1A, thus pressing against the central conductor 1A.

By providing the tilt preventing member 5 that prevents tilting of the central conductor 1A as in the present embodiment, even if the first direction L length of the tubular insulator holder 2A that holds the central conductor 1A is short, it is possible to prevent tilting of the central conductor 1A. Also, this tilt preventing member 5 is sandwiched between the annular extending portion 33A and the inner seal member 4A, thus preventing positional shifting of the tilt preventing member 5 itself. Accordingly, even if the terminal module 30A is given a compact configuration, it is possible to prevent axial shifting of the central conductor 1A.

(2) Although the central conductors 1 and 1A are constituted by only the straight linear portions 1a and 1Aa in the embodiments described above, a configuration is possible in which the first terminal portions 11 and 11A are bent and connected to the coaxial cable 120 for example, and there are no particular limitations on the shape of the central conductors 1 and 1A as long as they have the straight linear portions 1a and 1Aa.

(3) Although the inner ends 75a of the elastic portions 75 are brought into contact with the bottom portion 34a1 and the one side wall 34a2 of the third engaging recession portion 34a of the conductive shell 3 in the embodiments described above, the central portions of the elastic portions 75 may also be brought into contact with the bottom portion 34a1 of the third engaging recession portion 34a, and there are no particular limitations on the portions of contact between the elastic portions 75 and the third engaging recession portion 34a. Also, a configuration is possible in which the elastic portions 75 are bent from the opening edge portion 73e and project in a direction away from the side wall portion 72 (the direction away from the interior space E2 of the shield case 7).

(4) The arrangement positions of the inner seal members 4 and 4A in the first direction L in the terminal module 30 are not limited to the aspects illustrated in FIGS. 4 and 8. For example, the inner seal members 4 and 4A may be arranged on the second terminal portion 12 and 12A side relative to the insulator holder 2. Similarly, the tilt preventing member 5 may also be arranged on the second terminal portion 12 and 12A side relative to the insulator holder 2.

(5) The inner seal members 4 and 4A or the outer seal member 6 of the embodiments described above may be omitted as necessary, and one or three or more of the first annular protruding portions 41 and 41A and the second annular protruding portions 42 and 42A may be provided.

What is claimed is:
1. A connector device comprising:
 a terminal device having
 a central conductor that has a straight linear portion and is capable of transmitting a signal,
 an insulator holder that has, in a center, a through-hole for passage of the straight linear portion, and that is shaped as a tube and supports the central conductor while covering at least a portion of the straight linear portion, and
 a conductive shell that is shaped as a tube and covers an outward diameter direction side of the insulator holder; and a shield case that is electrically conductive, is shaped as a bottomed tube capable of being engaged with the terminal device, and shields an interior space from electromagnetic waves that propagate in an exterior space around the shield case, wherein the shield case has a bottom portion that extends orthogonal to a first direction that conforms to an extending direction of the straight linear portion, and a side wall portion that is bent from a periphery of the bottom portion and extends along the first direction, the bottom portion has an opening portion for passage of the terminal device, and a plurality of elastic portions that are capable of elastic deformation and are bent from an edge portion of the opening portion and project in the first direction, the shield case is engaged with the conductive shell of the terminal device with use of the elastic portions, and an annular recession portion is formed in a portion of the conductive shell that is engaged to the elastic portions, the annular recession portion being in contact with and electrically connected to the elastic portions.

2. The connector device according to claim 1, wherein the plurality of elastic portions are configured with mutually identical shapes, and are arranged with equal gaps there between in a circumferential direction.

3. The connector device according to claim 1, wherein the terminal device further has an annular inner seal member that is a circular ring-shaped member, and that seals an interior of the terminal device in a state where an outer circumferential portion on the outward diameter direction side presses against an inner circumferential surface of the conductive shell, and an inner circumferential portion on an inward diameter direction side presses against the central conductor.

4. The connector device according to claim 3, wherein a plurality of first annular protruding portions that press against the inner circumferential surface of the conductive shell are formed on the outer circumferential portion of the inner seal member, a plurality of second annular protruding portions that press against the outer circumferential surface of the central conductor are formed on the inner circumferential portion of the inner seal member, and a pair of one of the first annular protruding portions and one of the second annular protruding portions are arranged coplanar in a diameter direction.

5. The connector device according to claim 3, wherein the conductive shell has an inner extending portion that extends in the inward diameter direction from an inner circumferential surface, and the terminal device further has a tilt preventing member that is shaped as a circular ring, is arranged at a position sandwiched between the inner seal member and the inner extending portion, and prevents tilting of the central conductor.

6. The connector device according to claim 1, wherein the insulator holder has an engaging portion on a rear end side with respect to a direction of insertion into the conductive shell, the engaging portion protruding in the outward diameter direction and being capable of elastic deformation, and the conductive shell has an engaging recession portion that engages with the engaging portion.

7. The connector device according to claim 6, wherein a partition wall is formed on a bottom side of the engaging recession portion.

8. The connector device according to claim 6, wherein an annular projecting portion that projects in the outward diameter direction is formed on the straight linear portion that is covered by the insulator holder, and the annular projecting portion is integrated with the insulator holder.

9. An onboard camera comprising:
the connector device according to claim 1; and
a camera device that is connected to the connector device and has a imaging element, an electronic circuit that controls driving of the imaging element and processes a video signal output from the imaging element, and an optical system that includes a lens that condenses light onto the imaging element,
wherein the central conductor is electrically connected to the electronic circuit, and at least a portion of the electronic circuit is shielded by the shield case.

\* \* \* \* \*